(12) United States Patent
Morovic et al.

(10) Patent No.: US 11,057,543 B2
(45) Date of Patent: Jul. 6, 2021

(54) UPDATING A LOOKUP TABLE FOR AN IMAGING SYSTEM

(71) Applicant: HEWLETT-PACKARD DEVELOPMENT COMPANY, L.P., Spring, TX (US)

(72) Inventors: Peter Morovic, Sant Cugat del Valles (ES); Jan Morovic, London (GB); Victor Diego Gutierrez, Sant Cugat del Valles (ES); Javier Maestro Garcia, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 16/977,662

(22) PCT Filed: Mar. 12, 2018

(86) PCT No.: PCT/US2018/022038
§ 371 (c)(1),
(2) Date: Sep. 2, 2020

(87) PCT Pub. No.: WO2019/177580
PCT Pub. Date: Sep. 19, 2019

(65) Prior Publication Data
US 2020/0404123 A1 Dec. 24, 2020

(51) Int. Cl.
*H04N 1/60* (2006.01)
*G06K 15/02* (2006.01)

(52) U.S. Cl.
CPC ......... *H04N 1/6019* (2013.01); *G06K 15/027* (2013.01)

(58) Field of Classification Search
CPC combination set(s) only.
See application file for complete search history.

(56) References Cited

U.S. PATENT DOCUMENTS 5,491,568 A 2/1996 Wan
7,277,196 B2 10/2007 Van De Capelle et al.
(Continued)

FOREIGN PATENT DOCUMENTS

WO WO-2016119858 8/2016

*Primary Examiner* — Barbara D Reinier
(74) *Attorney, Agent, or Firm* — HP Inc. Patent Department

(57) ABSTRACT

Certain examples described herein relate to updating a lookup table for an imaging system. An initial lookup table for an imaging system is obtained, the initial lookup table mapping between a first color space and a second color space. A smoothed version of the initial lookup table is also obtained. Further obtained are color property values corresponding to nodes of the lookup tables that map from a vertex-to-vertex axis of the first color space. The color property values are derived from measurements of test areas rendered by the imaging system. For a target node of the smoothed version of the initial lookup table that maps from the vertex-to-vertex axis, a pair of nodes in the initial lookup table are selected based on the obtained color property values. A mapped value in the second color space for the target node is updated, based on an interpolation of mapped values for the pair of nodes in the initial lookup table. The mapped value for the target node is constrained based on a color property value for the target node.

15 Claims, 4 Drawing Sheets

(56) References Cited

U.S. PATENT DOCUMENTS

| | | |
|---|---|---|
| 7,768,682 B2 | 8/2010 | Mestha et al. |
| 8,593,692 B2 | 11/2013 | Chen et al. |
| 8,634,105 B2 | 1/2014 | Yu et al. |
| 2005/0093923 A1 | 5/2005 | Busch et al. |
| 2005/0135672 A1 | 6/2005 | Altenhof-Long et al. |
| 2007/0103707 A1 | 5/2007 | Klassen |
| 2010/0085605 A1 | 4/2010 | Shaw et al. |
| 2011/0038010 A1 | 2/2011 | Chen et al. |
| 2013/0076778 A1 | 3/2013 | Morovic |
| 2020/0228680 A1* | 7/2020 | Morovic ................. H04N 1/60 |

* cited by examiner

UPDATING A LOOKUP TABLE FOR AN IMAGING SYSTEM

BACKGROUND

An imaging system may be associated with a color space, defined by colorants available to the imaging system for outputting an image. For example, a printing system may be associated with a color space, defined by colorants available to the printing system for deposition or application to a print medium. An example of a colorant color space is the Cyan, Magenta, Yellow, Black (CMYK) color space, wherein four variables are used in a subtractive color model to represent respective quantities of colorants. Examples of colorants include inks, dyes, pigments, paints, toners, light emitters, and powders.

BRIEF DESCRIPTION OF THE DRAWINGS

Various features of the present disclosure will be apparent from the detailed description which follows, taken in conjunction with the accompanying drawings, which together illustrate, by way of example, features of the present disclosure, and wherein.

DETAILED DESCRIPTION

Figure 1:
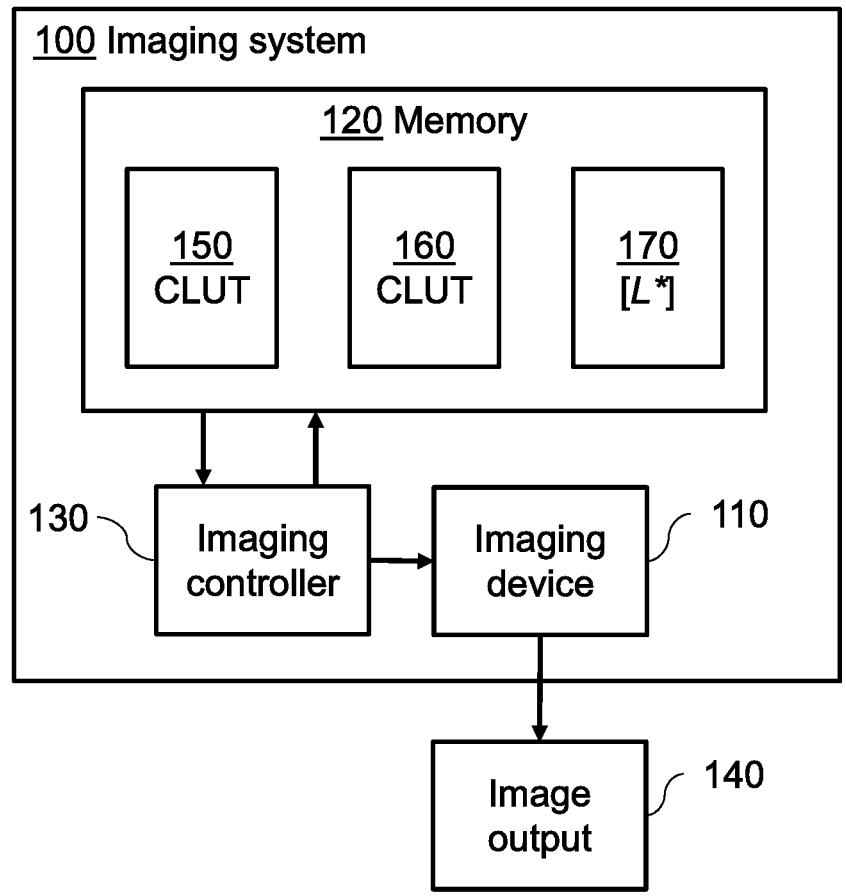
FIG. 1 is a schematic diagram of an imaging system according to an example.

Color can be represented within print and display devices in a variety of ways. For example, in one case, a color as observed visually by an observer is defined with reference to a power or intensity spectrum of electromagnetic radiation across a range of visible wavelengths. In other cases, a color model is used to represent a color at a lower dimensionality. For example, certain color models make use of the fact that color may be seen as a subjective phenomenon, i.e. dependent on the make-up of the human eye and brain. In this case, a "color" may be defined as a category that is used to denote similar visual perceptions; two colors are said to be similar if they produce a similar effect on a group of people. These categories can then be modelled using a lower number of variables.

Within this context, a color model may define a color space. A color space in this sense may be defined as a multi-dimensional space, with a point in the multi-dimensional space representing a color value and dimensions of the space representing variables within the color model. For example, in a Red, Green, Blue (RGB) color space, an additive color model defines three variables representing different quantities of red, green and blue colorant. In a digital model, values for these quantities may be defined with reference to a quantized set of values. For example, a color defined using an 8-bit RGB model may have three values (r, g, b) stored in a memory, wherein each variable r, g, and b may be assigned a value between 0 and 255. Other color spaces include: a Cyan, Magenta, Yellow and Black (CMYK) color space, in which four variables are used in a subtractive color model to represent different quantities of colorant (e.g. printing fluid for a printing system); the International Commission on Illumination (CIE) 1931 XYZ color space, in which three variables ('X', 'Y' and 'Z' or 'tristimulus values') are used to model a color; the CIE 1976 (L*, a*, b*—CIELAB or 'LAB') color space, in which three variables represent lightness ('L') and opposing color dimensions ('a' and 'b'); and the YUV color space, in which three variables represent the luminance ('Y') and two chrominance dimensions (U and V).

Image data, e.g. representing an image to be output by an imaging system, may comprise color data represented in a first color space (which may be termed an "image color space"), such as image-level pixel representations in the RGB color space. In an imaging pipeline, e.g. a printing pipeline in examples where the imaging device is a printing device, a color separation process may be used to map from the image color space to a second color space (which may be termed an "intermediate color space" or a "target color space") for use in outputting an image, e.g. in a printing process. For example, the imaging system may be associated with a color space, e.g. a colorant color space defined by colorants available to the imaging system for outputting an image. In examples, the imaging system comprises an imaging controller to output a signal to an imaging device, e.g. an electronic visual display or projector. The imaging controller may be implemented using machine readable instructions executed by a processing device and/or suitably programmed or configured hardware, e.g. circuitry. In these examples, the color space associated with the imaging system may be defined by color channels (i.e. colorants) available to the imaging device. In other examples, the imaging system comprises a printing system, and the colorant color space may therefore be defined by colorants available to the printing system for deposition or application to a print target.

The color separation process may utilize a data structure which stores a mapping from a color defined in the image color space to a set of parameters defined in the intermediate color space. For example, the mappings may be stored in a lookup table which is referenced by the color separation process to map from the image color space to the intermediate color space.

A printing system may utilize a halftoning process, and the intermediate color space may therefore be an area coverage space, such as the Neugebauer Primary area coverage (NPac) color space. An NPac vector in the NPac color space represents a statistical distribution of Neugebauer Primaries (NPs), e.g. NP vectors or output states for the imaging system, over an area of a halftone. For example, in a simple binary (bi-level, i.e. two drop states: "drop" or "no drop") printing system, an NP may be one of $2^k-1$ combinations of k printing fluids within the printing system, or an absence of printing fluid (resulting in $2^k$ NPs in total). A colorant or printing fluid combination as described herein may be formed of one or multiple colorants or printing fluids. For example, if a bi-level printing device uses CMY printing fluids there can be eight NPs. These NPs relate to the following: C, M, Y, CM, CY, MY, CMY, and W (white or blank indicating an absence of printing fluid). An NP may comprise an overprint of two available printing fluids, such as a drop of magenta on a drop of cyan (for a bi-level printing device or "printer") in a common addressable print area (e.g. a printable "pixel"). An NP may be referred to as a "pixel state".

In multi-level printers, e.g. where print heads can deposit N drop levels, an NP may include one of $N^k-1$ combinations of k printing fluids, or an absence of printing fluid (resulting in $N^k$ NPs in total). For example, if a multi-level printer uses CMY printing fluids with four different drop states ("no drop", "one drop", "two drops" or "three drops"), available NPs can include C, CM, CMM, CMMM, etc. In these cases, a set of NPs may represent a set of output states for an output area once an image is rendered. In certain cases, the set of NPs may be a subset of available NPs, e.g. constraints on drop states and/or colorant use may be applied to restrict the set of NPs.

Each NPac vector defines the probability distribution for colorant combinations for each pixel in the halftone (e.g. a likelihood that a particular colorant combination or output state is to be placed at each pixel location in the halftone or output representation). In this manner, a given NPac vector defines a set of halftone parameters that are used in the halftoning process to map a color defined in the image color space to NP vectors to be statistically distributed over the plurality of pixels for a halftone. Moreover, the statistical distribution of NPs to pixels in the halftone serves to control the colorimetry and other print characteristics of the halftone.

Spatial distribution of the NPs according to the probability distribution specified in the NPac vector may be performed using a halftoning method. Examples of suitable halftoning methods include matrix-selector-based PARAWACS (Parallel Random Area Weighted Area Coverage Selection) techniques and techniques based on error diffusion. An example of a printing system that uses area coverage representations for halftone generation is a Halftone Area Neugebauer Separation (HANS) pipeline.

As mentioned, during an imaging process, a plurality of color mappings may be accessed. Each color mapping provides a mapping from an element, e.g. a color value, in a first color space to a corresponding element, e.g. color value, in a second color space. For example, the first and second color spaces may each comprise one of an RGB color space, a CMYK color space, a CIE Lab color space, a CIE XYZ color space, and an NPac space. The first and/or second color space may be based on these color spaces, e.g. either comprise the color space directly or be a modified version of the space, such as a Yule-Nielsen modified XYZ color space. A color mapping may be implemented by way of a lookup table. The lookup table may comprise nodes, e.g. entries, which map a color value in the first color space to the second color space. In one case, this lookup table may map color values in three dimensions (e.g. RGB space) to NPac values in multiple dimensions (e.g. eight for CMY). Color mappings for values that lie between nodes in the lookup table may be determined using interpolation, e.g. using linear and/or non-linear interpolation.

"Smoothness" of a lookup table may be considered a measure of variance in the entries of the lookup table, e.g. in the color values corresponding to nodes in the lookup table. For example, an LUT with a measurable variance below a predetermined threshold may be considered "smooth". Variance, and therefore smoothness, may be determined by statistical methods. For example, variance may be related to a standard deviation of the entries in the lookup table, e.g. the standard deviation of the output color values mapped to by the lookup table.

The smoothness of a lookup table may directly impact image quality produced by an imaging system utilizing the lookup table. For example, the smoothness of the lookup table may affect color management effectiveness in an imaging process, such as a printing process.

For example, a lack of smoothness of a lookup table may result in a loss of smoothness in the display (or print) output, e.g. where the original color content specifies a gradual, smooth transition of color values, the output may comprise contours that do not smoothly transition, or "blend", as specified in the original color space. An unsmooth mapping between inputs and outputs of a lookup table may also impact color accuracy. For example, the color values in the second color space mapped to by the lookup table may be sampled in an imaging process, and it may be assumed that color management is continuous and smooth between the sampled color values. For example, a printing system may have a color separation lookup table comprising $17^3$ nodes, but an International Color Consortium (ICC) color profile associated with the printing system may be based on a sampling of between $7^3$ and $9^3$ nodes. For example, the lookup table may have a higher resolution than the ICC color profile. Therefore, usefully sampling of the lookup table may rely on the color separation being smooth and continuous between the samples taken as part of color management during the printing process.

A direct approach to providing smoothness may involve building a lookup table that has a measurable smoothness above a predetermined threshold, e.g. by defining predetermined individual mappings between corresponding elements in the first and second color spaces. In this respect, defining the predetermined mappings may be a complex and time-consuming process, e.g. due to the dimensionality of the first and/or second color space. For example, where the first and/or second color space is an NPac color space, the corresponding dimensionality is defined by the total number of NP states that are available for a given printing system, which in some cases may be in the order of 100,000 states or more.

Accordingly, smoothing processes may be applied to color lookup tables, e.g. in a post-processing stage of an imaging pipeline such as a printing pipeline, to provide smoothness. For example, a smoothing process may be carried out on a color lookup table to produce a smoother version of the color table, e.g. a version where there are smoother transitions between the mapped colors.

Processing axes, e.g. the neutral axis between the white and black points of a color space, in such smoothing operations can pose issues. For example, smoothing the values in the lookup table mapped from the neutral axis may undo specific choices that were preset for the mapping of the neutral colors (those colors located on the neutral axis). For example, specific mappings from a given axis, e.g. the neutral axis, may have been defined when building the lookup table. Thus, smoothing the values in the lookup table which map from the given axis may undo such specific mappings and choices for the associated colors, e.g. the neutral colors. On the other hand, excluding the values in the lookup table mapped from the given axis from smoothing may create a local discontinuity around the given axis in the new color space. Such a local discontinuity may present a lack of smoothness around the given axis compared to the rest of the lookup table, which can lead to contouring and other unwanted artefacts described above.

Accordingly, certain examples described herein relate to processing the mappings for a given axis, such as the neutral axis, in a lookup table. Certain examples described herein may enable smoothing of a lookup table which preserves specific choices made for the colors associated with the given axis when building the lookup table, and also smooths the given axis mappings so that the corresponding mapped values are continuous with their respective surrounding mapped values in the output color space. When applied to the neutral axis, the process may be referred to as a neutral axis re-linearization.

FIG. 1 shows an imaging system 100 according to an example. Certain examples described herein may be implemented within the context of this imaging system. As described above, in examples, the imaging system 100 may comprise a printing system, for example a 2D printing system such as an inkjet or digital offset printer, or a 3D printing system, otherwise known as an additive manufacturing system. In the example of FIG. 1, the imaging system 100 comprises an imaging device 110 (e.g. a printer or display device), a memory 120, and an imaging controller 130. The imaging controller 130 may be implemented using machine readable instructions that are executed by a processing device and/or suitably programmed or configured hardware. The imaging device 110 is arranged to produce an image output 140. For example, the imaging device 110 may include an electronic visual display such as a liquid crystal display (LCD) or a light emitting diode (LED) display or a 2D/3D printing system.

In examples where the imaging system 100 comprises a printing system, the imaging device 110 may comprise a printing device arranged to apply, e.g. print, a print material onto a print target in a printing process, for example to produce a print output as the image output 140. The print output may, for example, comprise colored printing fluids deposited on a substrate. The printing device may comprise an inkjet deposit mechanism, which may e.g. comprise a nozzle to deposit the print material. In 2D printing systems, the substrate may be paper, fabric, plastic or any other suitable print medium.

In 3D printing systems, the print output may be a 3D printed object. In such systems, the substrate may be a build material in the form of a powder bed comprising, for example, plastic, metallic, or ceramic particles. Chemical agents, referred to herein as "printing agents", may be selectively deposited onto a layer of build material. In one case, the printing agents may comprise a fusing agent and a detailing agent. In this case, the fusing agent is selectively applied to a layer in areas where particles of the build material are to fuse together, and the detailing agent is selectively applied where the fusing action is to be reduced or amplified. In some examples, colorants may be deposited on a white (or "blank") powder to color the powder. In other examples, objects may be constructed from layers of fused colored powder.

The memory 120 is to store an initial color lookup table (CLUT) 150 comprising entries, e.g. nodes, to map between color spaces. For example, nodes of the initial CLUT 150 may map respective color vectors in a first color space to corresponding color vectors in a second color space. The first and second color spaces may each comprise an RGB, CMYK, XYZ, CIE, LAB, YUV, or NPac color space. A vector in a color space, e.g. a color vector, may comprise components corresponding to values, e.g. coordinates, in the color space, e.g. (234, 122, 63) in RGB space. The vector may therefore comprise a colorimetric value, or point, in a respective color space. A vector in an NPac color space may comprise an NPac vector, as previously described. Where the vectors comprise NPac vectors, a CLUT, e.g. the initial CLUT 150, may be referred to as a "HANS lookup table". When an RGB mapping is used, the HANS lookup table may comprise $17^3$ entries. When a CMYK mapping is used, the HANS lookup table may comprise $9^4$ entries.

Figure 2:
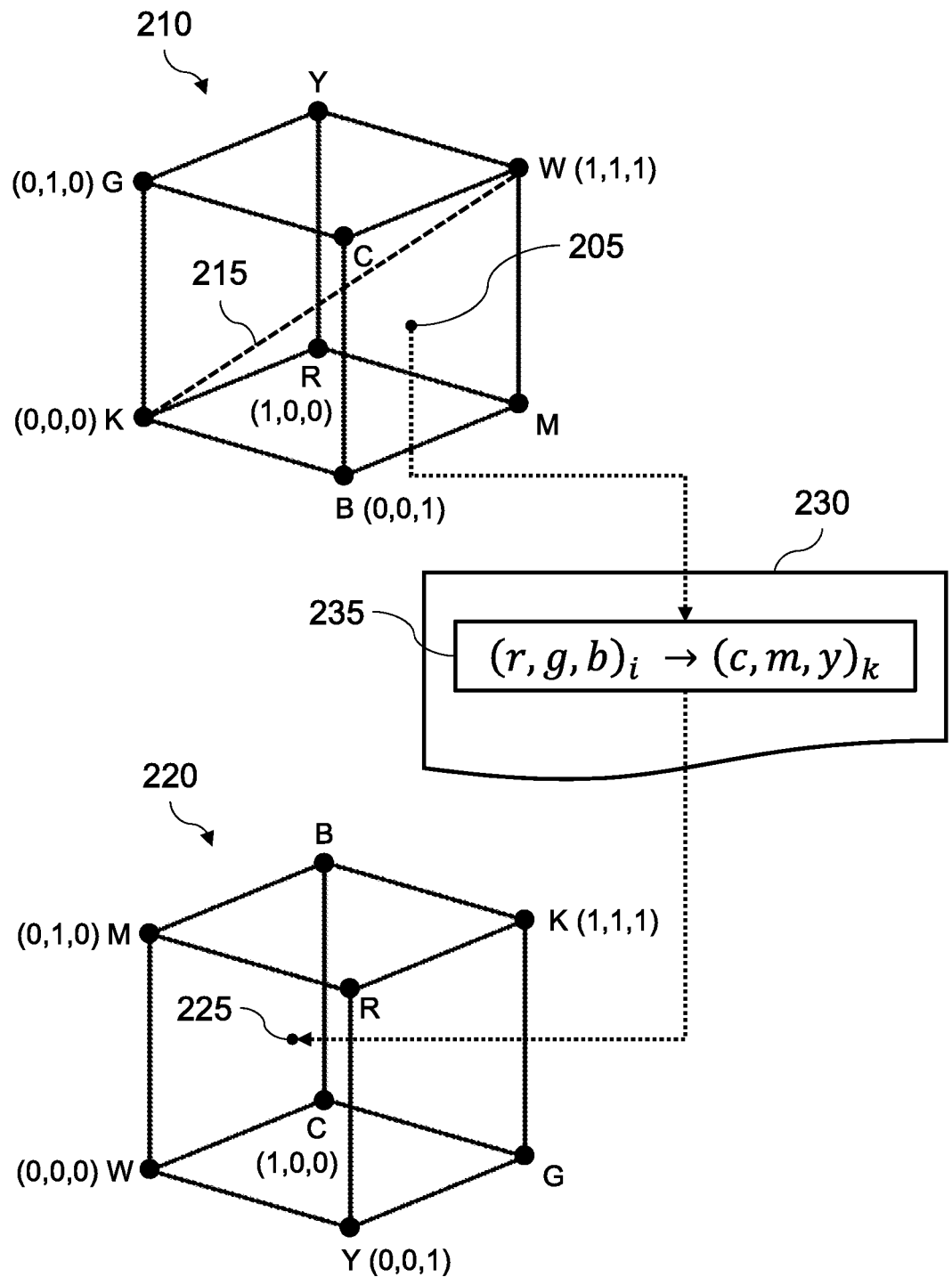
FIG. 2 is a schematic diagram showing a mapping from a first color space to a second color space, via a lookup table, according to an example.

FIG. 2 is schematic diagram showing a first color space 200, e.g. an image color space, being mapped to a second color space 220, e.g. a target color space, by a CLUT 230 in accordance with an example. In this example, the image color space 210 is an RGB color space represented as a cube in a three-dimensional space. In other examples, the image color space may be a CMYK color space, e.g. represented as a hypercube in four-dimensional space.

A vertex of a color space may be a location in the color space where all component coordinates are either at a minimum or maximum in the color space (e.g. at either 0 or 1 when normalized). For example, FIG. 2 shows a vertex corresponding to magenta (M) at normalized (r, g, b) coordinates (1, 0, 1) in the RGB color space 210. The other vertices of the RGB color space 210 shown in FIG. 2, in normalized (r, g, b) coordinates, are: black (K) at (0, 0, 0); white (W) at (1, 1, 1); red (R) at (1, 0, 0); green (G) at (0, 1, 0); blue (B) at (0, 0, 1); yellow (Y) at (1, 1, 0); and cyan (C) at (0, 1, 1). In examples where the first color space is a color space having N dimensions, the number of vertices in the first color space may be $2^N$. For example, the CMYK color space, having four dimensions, may be represented as a 4D hypercube with $2^4$=16 vertices.

In examples, the RGB color space may be defined as a 24-bit color space. Thus, each color in the RGB color space may be defined by a vector (r, g, b) where each component r, g and b of the vector takes an 8-bit integer value in the range 0 to 255. Accordingly, black may be defined as (0, 0, 0), white as (255, 255, 255), red as (255, 0, 0), green as (0, 255, 0), blue as (0, 0, 255), yellow as (255, 255, 0), magenta as (255, 0, 255) and cyan as (0, 255, 255).

In this example, the target color space 220 is a CMY color space represented also as a cube in a three-dimensional space. In other examples, the target color space may be a CMYK color space, e.g. represented as a hypercube in four-dimensional space. Further examples of target color spaces include three-dimensional CIELAB and CIELUV color spaces, and N-dimensional NPac and ink-vector color spaces, defined by a number N of NPs and ink-vectors, respectively.

The vertices of the CMY color space 220 shown in FIG. 2, in normalized (c, m, y) coordinates, are: white (W) at (0, 0, 0); black (K) at (1, 1, 1); cyan (C) at (1, 0, 0); magenta (M) at (0, 1, 0); yellow (Y) at (0, 0, 1); blue (B) at (1, 1, 0); green (G) at (1, 0, 1); and red (R) at (0, 1, 1).

The CLUT 230 comprises nodes to map from input vectors in the first color space 210 to output vectors in the second color space 220. For example, the CLUT 230 may comprise a data structure, and the nodes may comprise corresponding data entries in the lookup table. Each node 235 of the CLUT 230 may correspond to a mapping from an input color vector 205, e.g. $(r, g, b)_i$, in the first color space 210 to an output color vector 225, e.g. $(c, m, y)_k$, in the second color space 220.

The white point of a color space may comprise a set of coordinates in the color space, e.g. a set of tristimulus values, that corresponds to, or defines, the color white (W) in the color space. Similarly, the black point of a color space may comprise a set of coordinates in the color space, e.g. a set of tristimulus values, that corresponds to, or defines, the color black (K) in the color space. For example, in the RGB color space 210 shown in FIG. 2, the black point is located at normalized (r, g, b) tristimulus values (0, 0, 0) and the white point is located at normalized (r, g, b) tristimulus values (1, 1, 1). In the CMY color space 220 shown in FIG. 2, the white point is located at normalized (c, m, y) tristimulus values (0, 0, 0) and the black point is located at normalized (c, m, y) tristimulus values (1, 1, 1).

FIG. 2 shows the diagonal 215 between the black point (K) and the white point (W) of the first color space 210. This white-to-black axis, or diagonal, may be termed the "neutral-axis" or "gray ramp" of an image color space 210. A color vector which has values for each coordinate of a color space that are equal, e.g. (r, g, b) where r=g=b in the RGB color space), may be located on the neutral-axis of the color space. For example, the RGB color vector (0.2, 0.2, 0.2) lies on the neutral axis 215 of the RGB color space 210 shown in FIG. 2. In certain cases, the start and end points of the neutral axis may be defined as vertices, or other points, in a color space.

The white-to-black axis 215 may be a particular vertex-to-vertex axis of the first color space. For example, a vertex-to-vertex axis of a color space may comprise a vertex-to-vertex edge of the color space, e.g. a line between vertices of the color space that defines a boundary of the color space. In examples, a vertex-to-vertex axis of a color space may comprise a vertex-to-vertex diagonal on a surface of the color space. Such diagonals of the first color space on respective surfaces of the first color space may be termed "surface ramps" of the first color space. The surface ramps of the first color space may comprise color-to-white ramps between a color vertex of the first color space and the white point of the color space, e.g. the GW diagonal between the green (G) and white (W) vertices of the RGB color space 210. The surface ramps of the first color space may also comprise color-to-black ramps between a color vertex of the first color space and the black point of the color space, e.g. the MK, CK, and YK ramps of the RGB color space 210. In certain cases, the start and end points of the vertex-to-vertex axis may be defined as vertices, or other points, in a color space.

The memory 120 of the imaging system 100 is to also store a smoothed color lookup table 160 comprising nodes to map from a vertex-to-vertex axis of the first color space to vectors in the second color space. In examples, the vertex-to-vertex axis may comprise the neutral axis of the first color space. The smoothed color lookup table 160 is a smoothed version of the initial color lookup table 150. For example, a smoothing process may have been carried out on the initial CLUT 150 to produce the smoothed CLUT 160. In certain cases, the imaging controller 130 may perform the smoothing process to produce the smoothed CLUT 160. Examples of such smoothing processes are described below with reference to the method 300 of FIG. 3.

The memory 120 of the imaging system 100 is to further store color property values 170 representative of measurements of respective test areas rendered by the imaging device 110. For example, the memory 120 may store the color property values 170 as a dataset, e.g. as respective data entries in a data structure. The color property values 170 are associated with nodes from the lookup tables 150, 160. For example, the test areas may be rendered outputs corresponding to output vectors, defined in the target color space, which are mapped by the nodes in the lookup tables 150, 160. Two sets of test areas may therefore be rendered: a first set corresponding to output vectors which are mapped by the nodes in the initial CLUT 150; and a second set corresponding to output vectors which are mapped by the nodes in the smoothed CLUT 160.

Each color property value may correspond to a node in the respective CLUT 150, 160. In examples, each color property value corresponds to a node in the respective CLUT 150, 160 that maps from a color vector located on the vertex-to-vertex axis of the first color space.

In some examples, the color property values 170 stored by the memory 120 may be derived from an initial set of color property values representative of the measurements of respective test areas. For example, the initial set of color property values may correspond to a sample of nodes in the respective CLUT 150, 160. The initial set of color property values may be interpolated to obtain color property values corresponding to nodes in the respective CLUT 150, 160 that are not in the sample of nodes. Thus, the number of test areas rendered and measured to obtain the initial set of color property values may be less than the number of nodes in the respective CLUT 150, 160, e.g. less than the number of nodes in the respective CLUT 150, 160 that map from the vertex-to-vertex axis of the first color space.

In examples, the measurements of the respective test areas are color property measurements made by a measurement device, e.g. a spectrophotometer or a densitometer. The imaging system 100 may comprise the measurement device in certain cases. In some examples, the imaging system 100 may include a measurement interface to receive an indication of the measurements made by the measurement device. The measurement interface may comprise a physical connection, e.g. a Universal Serial Bus (USB) and/or serial data connection to electrically couple the measurement device, wherein data values are transmitted using an appropriate communication protocol over the interface. The measurement interface may comprise a wired or wireless interface. In an example, the measurement interface comprises a user interface. The user interface may, for example, comprise graphical components such as form fields to receive measurement data, e.g. data output by a separate measurement device.

In examples, the color property values 170 stored by the memory 120 may comprise lightness values. For example, the lightness values may correspond to values of a lightness parameter (L*) in a color space, e.g. the CIELAB or CIELUV color space. In some examples, the color property values 170 stored by the memory 120 may additionally or alternatively comprise chroma, color, colorfulness, saturation, hue, and/or brightness values.

In examples, the imaging system 100 comprises a printing system and the imaging device 110 comprises a printing device arranged to apply, e.g. print, print material onto a print target, as described above. In such examples, the rendered test areas may comprise patches of print material applied onto the print target by the printing device. The color property values 170 may thus be representative of the measurements of respective printed patches, e.g. made by the measurement device. Furthermore, in such examples the imaging controller 130 may comprise a print controller.

The imaging controller 130 (e.g. print controller) is to compare color property values associated with nodes from the smoothed color lookup table 160 with color property values associated with nodes from the initial color lookup table 150. The compared color property values are contained in the set of color property values 170 stored in the memory 120, for example.

For a given node in the smoothed color lookup table 160, the imaging controller 130 is to select, based on the compared color property values, a subset of nodes from the initial color lookup table 150. For example, the imaging controller 130 may select nodes having associated color property values that are each within a predefined range of a color property value associated with the given node in the smoothed color lookup table 160; the selected nodes forming the subset of nodes. As an example, if the given node in the smoothed color lookup table 160 had an associated lightness value L*=50 (on a scale from L*=0 to L*=100), and the predefined range were equal to 5, the imaging controller 130 may select nodes from the initial color lookup table 150 which have associated lightness values between L*=45 and L*=50.

The subset of nodes may comprise nodes that each map from the vertex-to-vertex axis of the first color space. In examples, the subset of nodes may comprise a pair of nodes. For example, the imaging controller 130 may be to select a pair of nodes in the initial lookup table where the interval between the respective color property values corresponding to the pair nodes is such that it comprises the color property value corresponding to the target node. In examples, the pair of nodes may be nodes that map from neighboring color vectors on the vertex-to-vertex axis of the first color space. Neighboring color vectors on the vertex-to-vertex axis may be considered as first and second color vectors where the coordinate values of the first vector differ to those of the second vector by a minimum non-zero amount in the color space. For example, where the first color space is an RGB color space defined as a 24-bit color space, and the vertex-to-vertex axis comprises the neutral axis, the color vectors (15, 15, 15) and (16, 16, 16) would be neighboring color vectors on the neutral axis since their respective r, g, b coordinate values differ by the minimum non-zero amount of 1 in the 24-bit RGB color space.

With the subset of nodes selected, the imaging controller 130 is to update a vector corresponding to the given node based on an interpolation of vectors corresponding to the subset of nodes, the updated vector being constrained based on a color property value for the given node. For example, the vectors in the second color space which correspond to the subset of nodes may be interpolated to obtain a resultant vector in the second color space. The vector in the second color space corresponding to the given node may then be updated with, e.g. replaced by, the resultant vector. In examples, the interpolation of the vectors in the second color space is such that the resultant vector in the second color space, obtained by the interpolation, is mapped by a node in the initial CLUT 150 that is associated with the same color property value as the given node. As such, the updated vector is constrained based on the color property value for the given node. The interpolation may be linear in examples. In some examples, the interpolation may involve an inverse weighting for the nodes in the subset of nodes.

Figure 3:
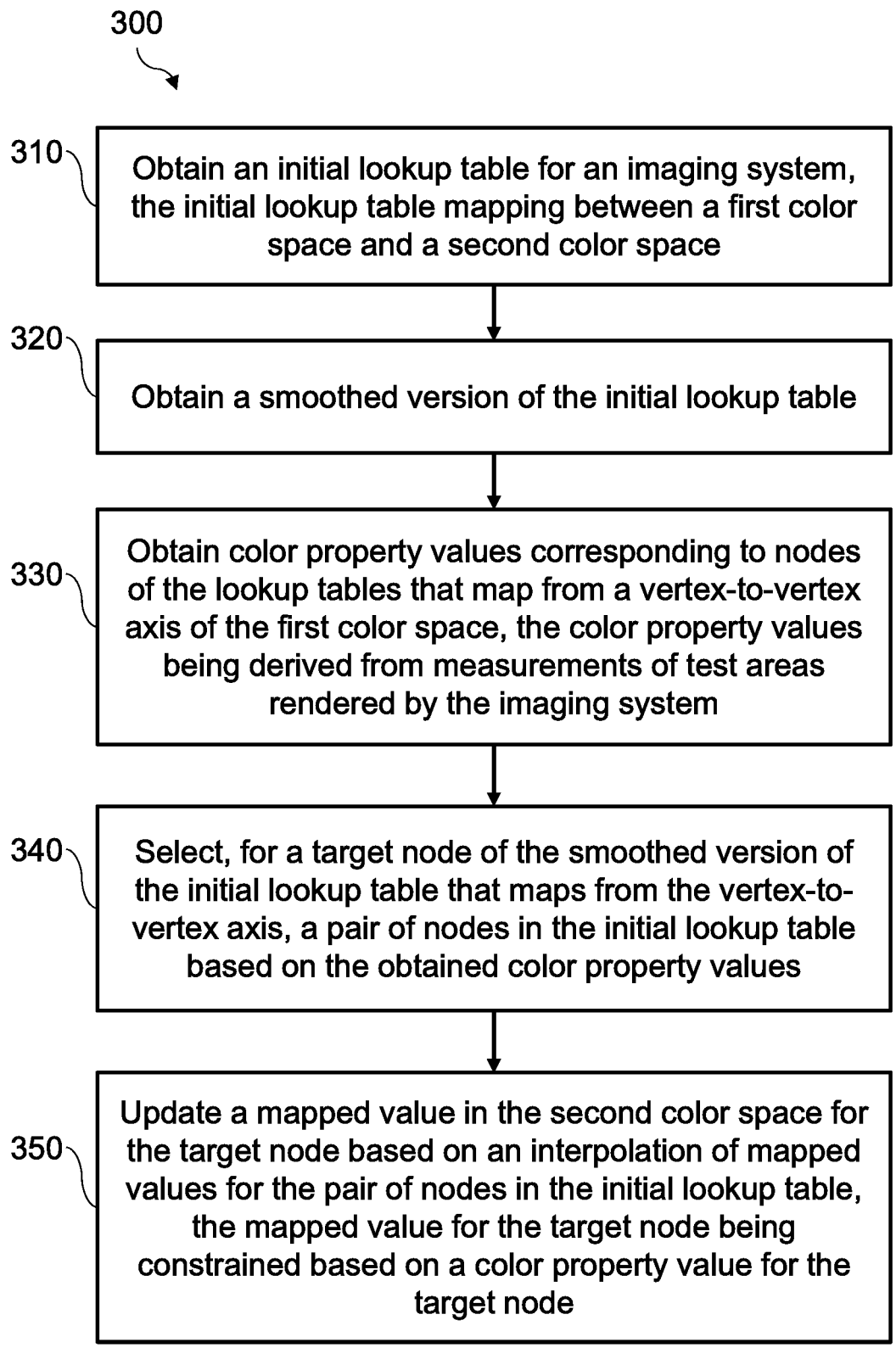
FIG. 3 is a flow diagram showing a method of updating a lookup table for an imaging system, according to an example.

FIG. 3 shows a method 300 for updating a lookup table for an imaging system. The imaging system may comprise an imaging system 100 in accordance with examples described previously. In examples, the method 300 is performed by an imaging controller, e.g. a print controller, such as the imaging controller 130 of FIG. 1. The imaging controller may perform the method based on instructions retrieved from a computer-readable storage medium. The imaging controller may be a component of an imaging system, for example the imaging system 100 of FIG. 1.

At item 310, an initial lookup table for the imaging system is obtained. The initial lookup table (LUT) maps between a first color space and a second color space. For example, the initial LUT comprises nodes to map values, e.g. color values, in the first color space to corresponding values in the second color space. In examples, a value in a respective color space may comprise a vector or a colorimetric value in the respective color space, e.g. comprising RGB, CMYK or XYZ color values, or NP area coverage values. The initial LUT may comprise a color lookup table (CLUT) 150 in accordance with examples described previously, e.g. with reference to FIG. 1.

At item 320, a smoothed version of the initial LUT is obtained. For example, a smoothing process may have been carried out on the initial lookup table to produce the smoothed lookup table. In examples, obtaining the smoothed version of the initial lookup table comprises smoothing the initial lookup table, e.g. carrying out the smoothing process on the initial lookup table. Performing processing to smooth, or "smoothing", a set of LUT nodes may involve applying a smoothing filter to the set of nodes. Examples of smoothing filters include a "weighted average" filter, an "inverse weighting" filter, and a Gaussian filter. Smoothing a set of LUT nodes may comprise smoothing each node in the set.

Smoothing the initial lookup table may include smoothing mapped values in the second color space for a set of nodes in the initial lookup table. For example, smoothing the mapped values in the second color space for the set of nodes may involve updating a given mapped value, associated with a given node in the set of nodes, based on other mapped values associated with other nodes in the set of nodes. For example, the other mapped values in the second color space may be processed, e.g. with the given mapped value, to update the given mapped value.

In certain cases, the other nodes in the set of nodes may be selected based on respective locations of their associated mapped values in the first color space, e.g. where a correspondingly mapped value is located in the first color space, relative to the value in the first color space that is mapped by the given node.

For example, referring back to FIG. 2, a node 235 in a LUT 230 may correspond to, e.g. store as part of the LUT data structure, a first color value defined in the first color space 210 (shown in FIG. 2). For example, the first color value $(r, g, b)_i$, may correspond to a location 205 in the first color space 200. Coordinates of the location 205, defined with respect to the first color space 210, e.g. RGB coordinates, may be stored in the LUT node 235 as the first color value $(r, g, b)_i$.

The node 235 may also correspond to, e.g. store, a second color value defined in the second color space 220. The node 235 may therefore map the first color value $(r, g, b)_i$, defined in the first color space 210 at the location 205, to the second color value $(c, m, y)_k$, defined in the second color space.

For ease of reference, a color value defined in the first color space, or input color space, may hereinafter be termed an "input color value". Similarly, a color value defined in the second color space, or output color space, may hereinafter be termed a "target color value".

Smoothing the LUT node 235 may involve updating the second color value $(c, m, y)_k$—an output color value—using other output color values. For example, the second color value stored by the LUT node 235 may be updated, e.g. replaced, by a weighted average of a set of output color values. In certain examples, the set of output color values used to update the second color value may be based on the respective locations of input color values to which the set of target color values map. In examples, a separation between a given input color value and the first color value may determine a respective weighting for the corresponding output color value when used to update the second color value $(c, m, y)_k$ in the LUT node 235. For example, an inverse weighting may be applied during the smoothing such that output color values corresponding to input color values that are located further from the first color value in the first color space 210 are weighted less than output color values corresponding to input color values that are located nearer to the first color value in the first color space 210. In other examples, different weightings may be applied to the set of output color values used to update the second color value (c, m, y)$_k$ stored by the LUT node 235. The weightings may similarly be based on the respective locations of the input color values (which correspond, i.e. map, to the set of output color values) relative to the first color value in the first color space 210, e.g. respective separations between them. In some cases, a zero weighting may be applied to the second color value (c, m, y)$_k$ that is to be updated.

At item 330, color property values corresponding to nodes of the lookup tables that map from a vertex-to-vertex axis of the first color space are obtained. In examples, the vertex-to-vertex axis comprises a neutral-axis of the first color space. For ease of reference, a node of the initial or smoothed lookup tables which maps from the neutral axis of the first color space may hereinafter be termed a "neutral node".

The color property values may have been derived from measurements of test areas rendered by the imaging system. In examples, the obtained color property values may comprise lightness values. For example, the lightness values may correspond to values of a lightness coordinate (L*) in a color space, e.g. the CIELAB or CIELUV color space. In some examples, the color property values may additionally or alternatively comprise chroma, color, colorfulness, saturation, hue, and/or brightness values.

In examples, the method 300 includes rendering the test areas using the imaging system. As described above, in some examples the imaging system comprises a printing system including a printing device arranged to apply, e.g. print, print material onto a print target. In such examples, rendering the test areas may comprise printing patches of print material onto the print target using the printing device.

The method 300 may also include measuring initial color property values associated with the test areas. This may be carried out using a measurement device, such as a spectrophotometer or a densitometer.

In examples, the measurements of the test areas comprise initial color property values associated with the test areas. For example, each initial color property value may correspond to a measurement of a color property of a given test area, e.g. using the measurement device. In examples, the method 300 involves deriving the color property values from the initial color property values. For example, selected initial color property values may be interpolated to obtain intermediate color property values, as described above.

At item 340, a pair of nodes in the initial lookup table are selected, for a target node of the smoothed version of the initial lookup table that maps from the vertex-to-vertex axis, based on the obtained color property values. In an example, the vertex-to-vertex axis comprises the neutral-axis, and the target node is a neutral node of the smoothed lookup table.

In examples, the pair of nodes in the initial lookup table may be selected such that the color property value corresponding to the target node falls within an interval between the color property values corresponding to the pair of nodes. The pair of nodes may be nodes that map from neighboring color values on the vertex-to-vertex axis of the first color space, e.g. neighboring neutral nodes, as described above. In an example, the vertex-to-vertex axis comprises the neutral-axis, and lightness may increase linearly along the neutral axis from the white point to the black point of the first color space. Thus, neighboring neutral nodes may have different associated lightness values, one lower and one higher. The lower lightness value may be associated with the neutral node that maps from a color value closer to the black point of the first color space, and vice versa.

At item 350, a mapped value in the second color space for the target node is updated based on an interpolation of mapped values for the pair of nodes in the initial lookup table. The mapped value for the target node is constrained based on a color property value for the target node. For example, the method 300 may involve linearly interpolating the mapped values for the pair of nodes to obtain a given mapped value in the second color space having the same color property value as the target node.

The vertex-to-vertex axis may comprise one degree of freedom along that axis. For example, the neutral axis of the first color space comprises one degree of freedom, since the coordinates of each value on the neutral axis are all equal, e.g. r=g=b in the RGB color space.

Linearly interpolating to obtain the given mapped value may involve computing v, representing the given mapped value, in the following expression:

$$v = v_0 + (l - l_0)\frac{v_1 - v_0}{l_1 - l_0},$$

Where $l_0$ and $l_1$ are the respective color property, e.g. lightness, values associated with the pair of nodes; l is the color property, e.g. lightness, value of the target node, and $v_0$ and $v_1$ are the respective mapped values of the pair of nodes. For example, $v_0$ and $v_1$ may comprise color values that are respectively mapped by the selected pair of nodes.

The linear interpolation may produce a resultant value, e.g. colorant value or color vector. The mapped value for the target node may thus be updated with the resultant value as part of item 350. Linearly interpolating these color values along the 1D vertex-to-vertex axis mapped to by the initial LUT, as described above, may allow the vertex-to-vertex axis mapped to by the updated LUT to also be a 1D subspace of the second color space, and to thus not be contaminated by other colors. Thus, the method 300 may correct for contamination of the vertex-to-vertex axis introduced by the smoothing process to obtain the smoothed version of the initial LUT.

Certain methods and systems as described herein may be implemented by a processor that processes computer program code that is retrieved from a non-transitory storage medium.

Figure 4:
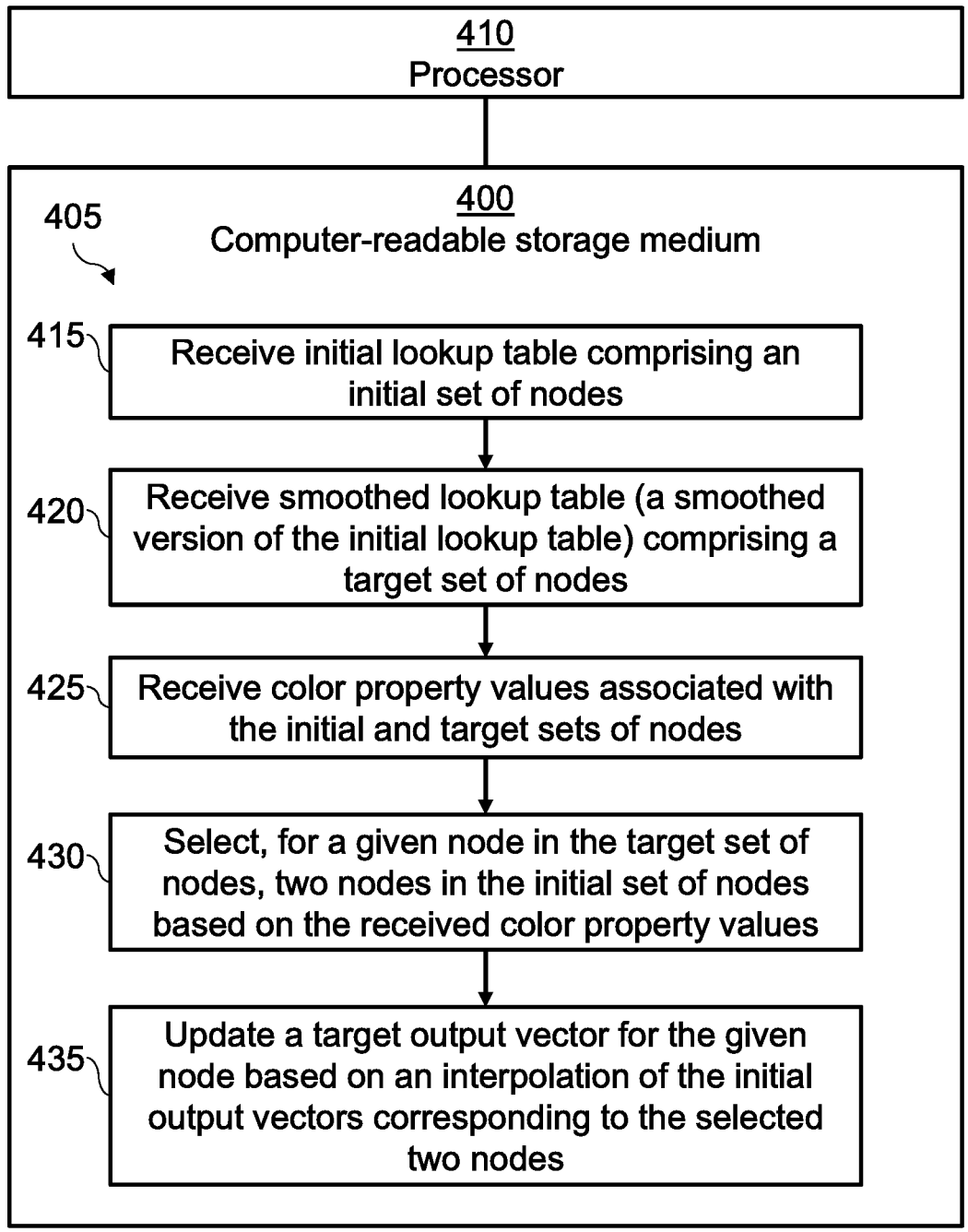
FIG. 4 is a schematic diagram showing a computer-readable storage medium comprising a set of computer-readable instructions and connected to a processor, according to an example.

FIG. 4 shows an example non-transitory computer-readable storage medium 400 comprising a set of computer-readable instructions 405. The computer-readable storage medium 400 is communicatively coupled to a processor 410. The processor 410 and the computer-readable storage medium 400 may be components of an imaging system, for example the imaging system 100 described in examples above. The set of computer-readable instructions 405 may be executed by the processor 410.

In the example shown in FIG. 4, instruction 415 instructs the processor 410 to receive an initial lookup table comprising an initial set of nodes that map input vectors on a vertex-to-vertex axis of a first color space to initial output vectors in a second color space. In examples, the vertex-to-vertex comprises a neutral-axis of the first color space. Each node may correspond to a mapping from an input vector to an output vector. The lookup table may comprise a data structure. The nodes may comprise corresponding data entries in the lookup table. The lookup table may comprise a CLUT 150 or LUT according to any of the examples described herein. In certain cases, a lookup table may have several specific nodes or mappings, wherein interpolation is used outside of these nodes or mappings.

As described herein, a vector in a color space may comprise components corresponding to values, e.g. coordinates, in the color space, e.g. (234, 122, 63) in RGB space. The vector may therefore comprise a colorimetric value, or point, in a respective color space. A vector in an NPac color space may comprise an NPac vector.

Instruction 420 instructs the processor 410 to receive a smoothed lookup table. The smoothed lookup table is a smoothed version of the initial lookup table. For example, a smoothing process may have been carried out on the initial lookup table to produce the smoothed lookup table. The smoothing process may have been applied in a post-processing stage of an imaging pipeline such as a printing pipeline.

The smoothed lookup table comprises a target set of nodes that map input vectors on the vertex-to-vertex axis of the first color space to respective target output vectors in the second color space.

Instruction 425 instructs the processor 410 to receive color property values associated with the initial and target set of nodes, the color property values being derived from color property measurements of test areas rendered by the imaging system.

Instruction 430 instructs the processor 410 to select, for a given node in the target set of nodes, two nodes in the initial set of nodes based on the received color property values.

Instruction 435 instructs the processor 410 to update a target output vector for the given node based on an interpolation of the initial output vectors corresponding to the selected two nodes. The target output vector is constrained based on a received color property value for the given node.

In examples, the machine-readable storage medium 400 comprises program code to implement lookup table smoothing techniques and methods described above with reference to FIG. 3.

Processor 410 can include a microprocessor, microcontroller, processor module or subsystem, programmable integrated circuit, programmable gate array, or another control or computing device. The computer-readable storage medium 400 can be implemented as one or multiple computer-readable storage media. Machine-readable media 400 can be any non-transitory media that can contain, store, or maintain programs and data for use by or in connection with an instruction execution system. For example, the computer-readable storage medium 400 may include different forms of memory including semiconductor memory devices such as dynamic or static random access memories (DRAMs or SRAMs), erasable and programmable read-only memories (EPROMs), electrically erasable and programmable read-only memories (EEPROMs) and flash memories; magnetic disks such as fixed, floppy and removable disks; other magnetic media including tape; optical media such as compact disks (CDs) or digital video disks (DVDs); or other types of storage devices. The computer-readable instructions 405 can be stored on one computer-readable storage medium, or alternatively, can be stored on multiple computer-readable storage media. The computer-readable storage medium 400 or media can be located either in an imaging system, such as a printing system, or located at a remote site from which computer-readable instructions can be downloaded over a network for execution by the processor 410.

According to some examples, the second color space may be defined as material volume coverage space for use in an additive manufacturing apparatus. In such examples, the vector components of a material volume coverage vector (MVoc) represent all materials available to the additive manufacturing apparatus and their combinations. In other words, the MVoc vectors are an enumeration of possible build or deposit states available to the additive manufacturing apparatus. The vector components of the MVoc may be considered analogous to the concept of Neugebauer Primaries as discussed above. In this analogy, each vector component may be considered to comprise a volume coverage of a "material primary". As such the material volume coverage vector has a dimensionality representative of these states and contains the volume coverages (e.g. probabilities) associated with each state. Or in other words, the MVoc comprises weighted combinations or probabilities of material primaries. Thus, according to some examples, the techniques and methods described above with reference to FIG. 3 may be applied to update a lookup table for mapping to an MVoc space, e.g. from an image color space, in the additive manufacturing process.

Certain examples described herein allow for International Color Consortium (ICC) profiling of the updated LUT. For example, the lightness measurements of respective test areas, e.g. rendered by the imaging device, may allow for the building of an ICC profile. For example, test areas corresponding to the smoothed lookup table and the original vertex-to-vertex axis may be rendered by the imaging system (e.g. printed by the printing system) for carrying out certain methods described herein. An ICC profiler may be provided with the smoothed LUT nodes that do not map from the vertex-to-vertex (e.g. neutral) axis and the updated LUT nodes that do map from the vertex-to-vertex (e.g. neutral) axis, the latter of which are obtainable via the described methods, to build an ICC profile. Therefore, further rendering (e.g. printing) of test areas may not be used to build the ICC profile.

The preceding description has been presented to illustrate and describe examples of the principles described. This description is not intended to be exhaustive or to limit these principles to any precise form disclosed. Many modifications and variations are possible in light of the above teaching. Although the flow diagram shows a specific order of execution, the order of execution may differ from that which is depicted.

What is claimed is:

1. A method comprising:
    obtaining an initial lookup table for an imaging system, the initial lookup table mapping between a first color space and a second color space;
    obtaining a smoothed version of the initial lookup table;
    obtaining color property values corresponding to nodes of the lookup tables that map from a vertex-to-vertex axis of the first color space, the color property values being derived from measurements of test areas rendered by the imaging system;
    selecting, for a target node of the smoothed version of the initial lookup table that maps from the vertex-to-vertex axis, a pair of nodes in the initial lookup table based on the obtained color property values; and
    updating a mapped value in the second color space for the target node based on an interpolation of mapped values for the pair of nodes in the initial lookup table, the mapped value for the target node being constrained based on a color property value for the target node.

2. The method of claim 1, wherein the obtaining the smoothed version of the initial lookup table comprises smoothing the initial lookup table by smoothing mapped values in the second color space for a set of nodes in the initial lookup table.

3. The method of claim 2, wherein the smoothing the mapped values for the set of nodes comprises:
updating a given mapped value, associated with a given node in the set of nodes, based on other mapped values associated with other nodes in the set of nodes.

4. The method of claim 1, comprising:
rendering the test areas using the imaging system; and
measuring initial color property values associated with the test areas.

5. The method of claim 1, wherein the measurements of the test areas comprise initial color property values associated with the test areas, the method comprising:
deriving the color property values from the initial color property values,
wherein the deriving comprises interpolating selected initial color property values to obtain intermediate color property values.

6. The method of claim 1, wherein the selecting the pair of nodes comprises selecting the pair of nodes in the initial lookup table such that the color property value corresponding to the target node falls within an interval between the color property values corresponding to the pair of nodes.

7. The method of claim 1, comprising linearly interpolating the mapped values for the pair of nodes to obtain a given mapped value in the second color space having the same color property value as the target node; and
updating the mapped value for the target node with the given mapped value.

8. The method of claim 1, wherein the color property values comprise lightness values.

9. An imaging system comprising:
an imaging device to produce an image output;
a memory storing:
an initial color lookup table comprising nodes to map from a vertex-to-vertex axis of a first color space to vectors in a second color space; and
a smoothed color lookup table comprising nodes to map from the vertex-to-vertex axis of the first color space to vectors in the second color space, the smoothed color lookup table being a smoothed version of the initial color lookup table; and
color property values representative of measurements of respective test areas rendered by the imaging device that are associated with nodes from the lookup tables;
an imaging controller to:
compare color property values associated with nodes from the smoothed color lookup table with color property values associated with nodes from the initial color lookup table; and
for a given node in the smoothed color lookup table:
select, based on the compared color property values, a subset of nodes from the initial color lookup table; and
update a vector corresponding to the given node based on an interpolation of vectors corresponding to the subset of nodes, the updated vector being constrained based on a color property value for the given node.

10. The imaging system of claim 9, comprising a spectrophotometer or a densitometer,
wherein the measurements of respective test areas comprise color property measurements made by the spectrophotometer or the densitometer.

11. The imaging system of claim 9, wherein the color property values comprise lightness values.

12. The imaging system of claim 9, comprising a printing system,
wherein the imaging device comprises a printing device to apply print material onto a print target, and
wherein the imaging controller comprises a print controller.

13. The imaging system of claim 9, wherein the vertex-to-vertex comprises a neutral-axis of the first color space.

14. The imaging system of claim 9, wherein the imaging controller is to:
interpolate the vectors in the second color space corresponding to the subset of nodes to obtain a new vector in the second color space having the same color property value as the given node; and
update the vector corresponding to the given node with the new vector.

15. A non-transitory computer-readable storage medium comprising a set of computer-readable instructions that, when executed by a processor of an imaging system, cause the processor to:
receive an initial lookup table comprising an initial set of nodes that map input vectors on a vertex-to-vertex axis of a first color space to initial output vectors in a second color space;
receive a smoothed lookup table comprising a target set of nodes that map input vectors on the vertex-to-vertex axis to respective target output vectors in the second color space, the smoothed lookup table being a smoothed version of the initial lookup table;
receive color property values associated with the initial and target set of nodes, the color property values being derived from color property measurements of test areas rendered by the imaging system;
select, for a given node in the target set of nodes, two nodes in the initial set of nodes based on the received color property values; and
update a target output vector for the given node based on an interpolation of the initial output vectors corresponding to the selected two nodes, the target output vector being constrained based on a received color property value for the given node.

* * * * *